United States Patent
Merdinger et al.

(10) Patent No.: US 11,087,374 B2
(45) Date of Patent: *Aug. 10, 2021

(54) DOMAIN NAME TRANSFER RISK MITIGATION

(71) Applicant: Go Daddy Operating Company, LLC, Scottsdale, AZ (US)

(72) Inventors: Richard Merdinger, Iowa City, IA (US); Jody Kolker, Mount Vernon, IA (US); Christine Turner, Marion, IA (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/547,293

(22) Filed: Aug. 21, 2019

(65) Prior Publication Data

US 2019/0378186 A1 Dec. 12, 2019

Related U.S. Application Data

(63) Continuation of application No. 14/681,464, filed on Apr. 8, 2015, now Pat. No. 10,402,876.

(51) Int. Cl.
*G06Q 30/00* (2012.01)
*G06F 15/16* (2006.01)
*H04L 12/26* (2006.01)
*G06Q 30/06* (2012.01)
*H04L 29/12* (2006.01)

(52) U.S. Cl.
CPC ...... *G06Q 30/0609* (2013.01); *H04L 61/1511* (2013.01)

(58) Field of Classification Search
CPC .................. G06Q 30/0609; H04L 61/1511
See application file for complete search history.

(56) References Cited

U.S. PATENT DOCUMENTS

| | | | |
|---|---|---|---|
| 2008/0215716 A1* | 9/2008 | Parsons ................ | H04L 43/00 709/223 |
| 2015/0256424 A1* | 9/2015 | Kaliski, Jr. .......... | H04L 43/062 709/224 |
| 2015/0262193 A1* | 9/2015 | Carvalho ........... | G06Q 30/0185 705/318 |

* cited by examiner

*Primary Examiner* — Talia F Crawley
(74) *Attorney, Agent, or Firm* — Greenberg Traurig, LLP

(57) ABSTRACT

Systems and methods of the present invention provide for one or more server computers communicatively coupled to a network and configured to: receive a request for a modification to domain name management; analyze metadata and registrant accounts associated with the request; determine whether related domain name activities indicate high or low risk of malicious behavior; if high risk, the request may be queued for manual review; on manual review, if the request is deemed high risk, an attempt to contact the registrant may be made; if unsuccessful, or if the registrant verifies an invalid request, the request may be cancelled. if the behavior or request is low risk, and/or if the registrant confirms the request is valid, the request may be approved and fulfilled.

20 Claims, 3 Drawing Sheets

DOMAIN NAME TRANSFER RISK MITIGATION

CROSS-REFERENCES TO RELATED APPLICATIONS

This application is a continuation of U.S. application Ser. No. 14/681,464 filed Apr. 8, 2015, and entitled "DOMAIN NAME TRANSFER RISK MITIGATION," the entirety of which is hereby incorporated by reference.

FIELD OF THE INVENTION

The present invention generally relates to the field of domain names and specifically to the field of increasing security for domain name transfers by: assessing the characteristics of a domain name transfer to identify domain names that are at high risk of being part of an unauthorized domain name transfer or theft; and providing increased scrutiny on the transfer request in an effort to protect customers' domain names.

SUMMARY OF THE INVENTION

The present inventions provide systems and methods comprising one or more server computers communicatively coupled to a network and configured to: receive a request for a modification to management of a domain name; analyze in association with the request: at least one data associated with the request; and an account for a registrant of the domain name; dynamically determine, from the at least one metadata or the account, whether an activity associated with the domain name indicates a high risk or a low risk of a malicious behavior; responsive to a determination that the activity indicates a low risk, automatically handle the request; responsive to a determination that the activity indicates a high risk, move the request to a queue for a manual review; receive a user input result from the manual review determining whether the request is deemed a high risk; responsive to a determination that the request is deemed a high risk, automatically determine whether the registrant is available via a contact associated with the account; responsive to a determination that the customer is not available via the contact, automatically cancel the request; responsive to a determination that the customer is available via the contact, determine whether the request is a valid request; responsive to a determination that the request is not a valid request, automatically cancel the request; and responsive to a determination that the request is a valid request, approve the request.

The above features and advantages of the present invention will be better understood from the following detailed description taken in conjunction with the accompanying drawings.

DETAILED DESCRIPTION

Figure 1:
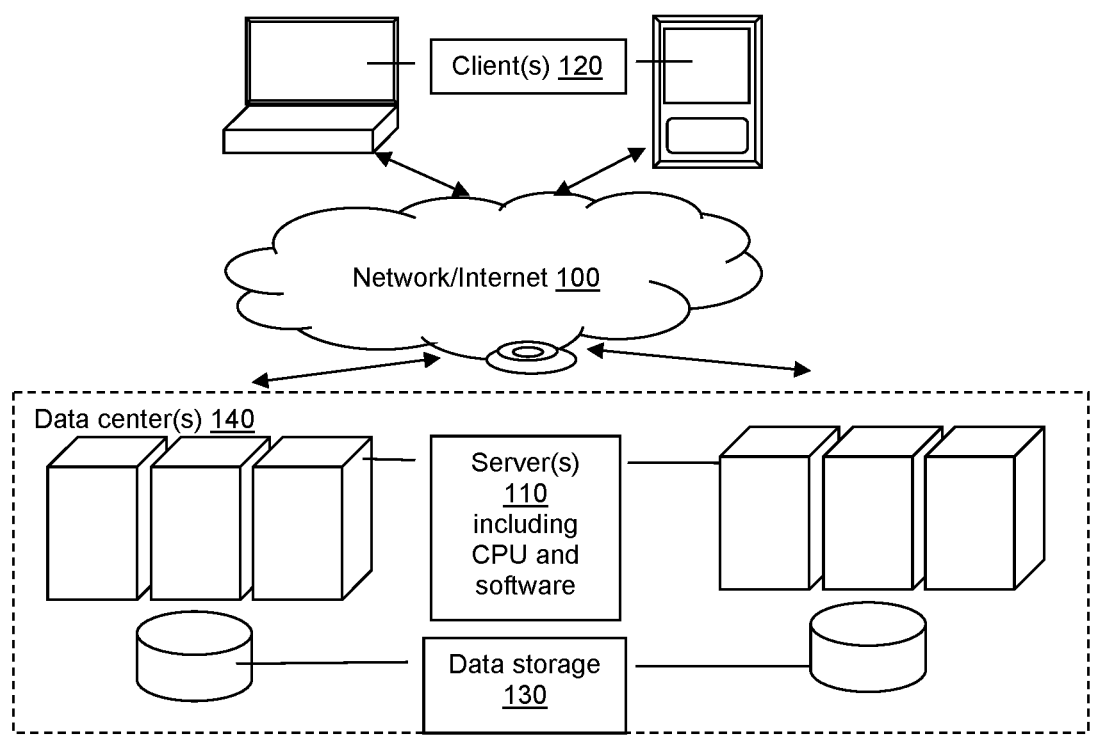
FIG. 1 illustrates a possible system for domain name transfer risk mitigation.

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

As the Internet has grown in size and influence, Domain names have become a digital asset with significant financial value. The high value associated with domain names have caused some individuals to become involved in a multitude of unscrupulous activities surrounding domain names.

As non-limiting examples, the value of domain names may cause some individuals to hijack the registration and control of domain names. Domain name hijacking or domain name theft may involve changing the registration of a domain name without the permission of its original registrant, and may be defined as an activity between two independent parties. As a non-limiting example, a domain name hijacker may acquire personal information about the actual domain owner, possibly from domain name registry records, and impersonate them in order to persuade the domain name registrar to modify the registration information and/or transfer the domain name to another registrar (the hijacker), who would then gain full control of the domain name.

Domain disputes involving the domain name may also arise between parties with a pre-existing relationship, such as business partners, married partners, etc. Non-limiting examples of such domain disputes may include unauthorized domain transfers.

Domain name hijacking has created a need for increased security when a domain name is registered, renewed, transferred between registrars or registrants, and/or when any other administrative or management functions affecting the domain name are needed. Increased security for such functions may require domain name authorization codes (auth codes) to ensure that the person requesting such change is in fact the registrant of the domain name. Auth codes may identify a valid registrant of a domain name. and may represent a uniform means to protect domain names by requiring verification of the valid registrant to prevent hijacking or other unauthorized domain name transfer activities by ensuring that only the rightful domain name registrant can control domain name administrative or management functions.

As disclosed herein, an auth code may also refer to a domain name transfer key, an EPP key, or any other known or proprietary security code used to prevent a domain name from being hijacked or otherwise transferred without authorization. It should be noted, however, that the synonymous use of these terms and/or phrases is for clarity and simplicity within the current disclosure. The application of each of these terms and/or phrases, as used interchangeably, should still retain any characteristics or subtle differences between them, as known in the art.

An auth code may be generated by a registrar and used to "unlock" the administrative functions associated with a domain name. For example, the auth code may support transferring any domain name from one registrar to another. Although the auth code may help identify the domain name registrant and may be required for a domain name transfer, it does not necessarily indicate approval of the transfer.

Auth codes may be generated and transmitted via the Extensible Provisioning Protocol (EPP)—a protocol for allocating functions for objects, such as domain names, within registries over the Internet. EPP is often a simple text string, but may be based on a structured, text-based format, such as Extensible Markup Language (XML). EPP, or any other security measures known in the art may provide communication between domain name registries, domain name registrars and domain name registrants, creating a means for the EPP key to be transmitted between these entities. Currently, the typical means for transmitting the domain change key is to send the EPP key via email to the registrant, who utilizes the key as part of an EPP transfer command.

EPP keys, as a non-limiting example of auth codes, may comprise a unique 6 to 32 character code assigned to a domain. They are designed to prevent fraudulent or unauthorized transfers. This code is an extra safety feature, similar to a credit card verification code or PIN, for a domain, that helps ensure that the customer transferring the domain name is indeed the owner of that domain name.

As noted above, domain name hijacking and/or other unauthorized changes to domain names are a common and pervasive security risk. Applicant has identified multiple weaknesses in presently existing systems and methods for providing security for such domain name administration or management.

Domain names are intellectual property that can readily be stolen by account compromise. However, registrars respond to domain name search requests by either using a simple password before disclosing the auth codes within a user account, or they simply email the auth codes to a single, known email address used by the registrant. In these situations, the user account may be hacked, or a man in the middle email hacker (or anyone else with access to the email account) may have access to the auth code sent in this manner.

Applicant has therefore determined that optimal systems and methods may mitigate the dangers of domain name transfer by assessing the characteristics of a domain transfer to identify those that are at high risk of being part of a domain theft and providing increased scrutiny on the transfer request in an effort to protect customers' domains. The disclosed invention attenuates such risks by injecting an algorithmic filtering system and increased scrutiny on potentially bad transfers. A domain name registrar or other domain name manager may inject additional pathways and logic into the standard domain transfer processes that will leverage the dynamic algorithm disclosed herein to assess the likelihood that a domain transfer or a set of domain transfers is not valid.

The algorithmic filtering system may assess the characteristics of a domain name transfer to identify those that are at high risk of being part of a domain theft and may further provide increased scrutiny on the transfer request in an effort to protect customers' domain names. The algorithmic filtering system may include an automated process to detect risky transfer requests and route them through a manned queue for analysis and approval.

Thus, the disclosed invention may comprise: 1) a Transfer Risk Evaluation Algorithm (TREA); and 2. a Transfer Workflow System, comprising a transfer workflow which incorporates the TREA as a filtering mechanism to identify transfer requests that are identified as high risk transfer requests, which may be handled by a more rigorous manual review process.

Although the TREA system may be used to access the auth codes, its focus may be on honoring the auth code once received. For example, an unauthorized user may gain access to the auth codes. Even though the access to the auth codes is secure, if the auth codes are intercepted and used by this unauthorized user, the security may have no utility. Thus, the TREA may analyze patterns of use that lead up to the acquisition of the auth codes (which could be days before use), characteristics of the account/customer behavior, etc.

The manual review process may analyze a complete domain history, previous customer behavior, customer persona, assets attached to the domain, etc. As described in more detail herein, this process may include a proactive call to the customer for verification of the transfer intent.

Domains deemed high-risk through the TREA may be entered into an evaluation queue for the manual review process. An administrator, possibly a registrar of the domain name, may group the domain names according to a user/shopper/customer id and review each domain name as well as individual flagged criteria. Based on any recent account activity updates, the representative performing the manual review may contact a shopper, registrant, administrator, technical, and/or billing phone number, etc. to validate the transfer. The representative may also use a SMS code sent to the phone number on file. Verification via email may not be used in the case of a compromised email account.

If the representative is able to receive confirmation that the transfer request is valid, they may approve the transfer request and it will proceed by system design. If the user/shopper/registrant confirms that the transfer was not authorized, the representative may deny the transfer request via an evaluation tool interface and the domain may remain at the present registrar. In some embodiments, a precautionary 60-day transfer lock on the domain name may prevent any other unauthorized transfers.

Thus, the disclosed invention may increase security by confirming the auth codes after the domain name registrant and all designated recipients have been authenticated through the TREA and the transfer workflow system.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
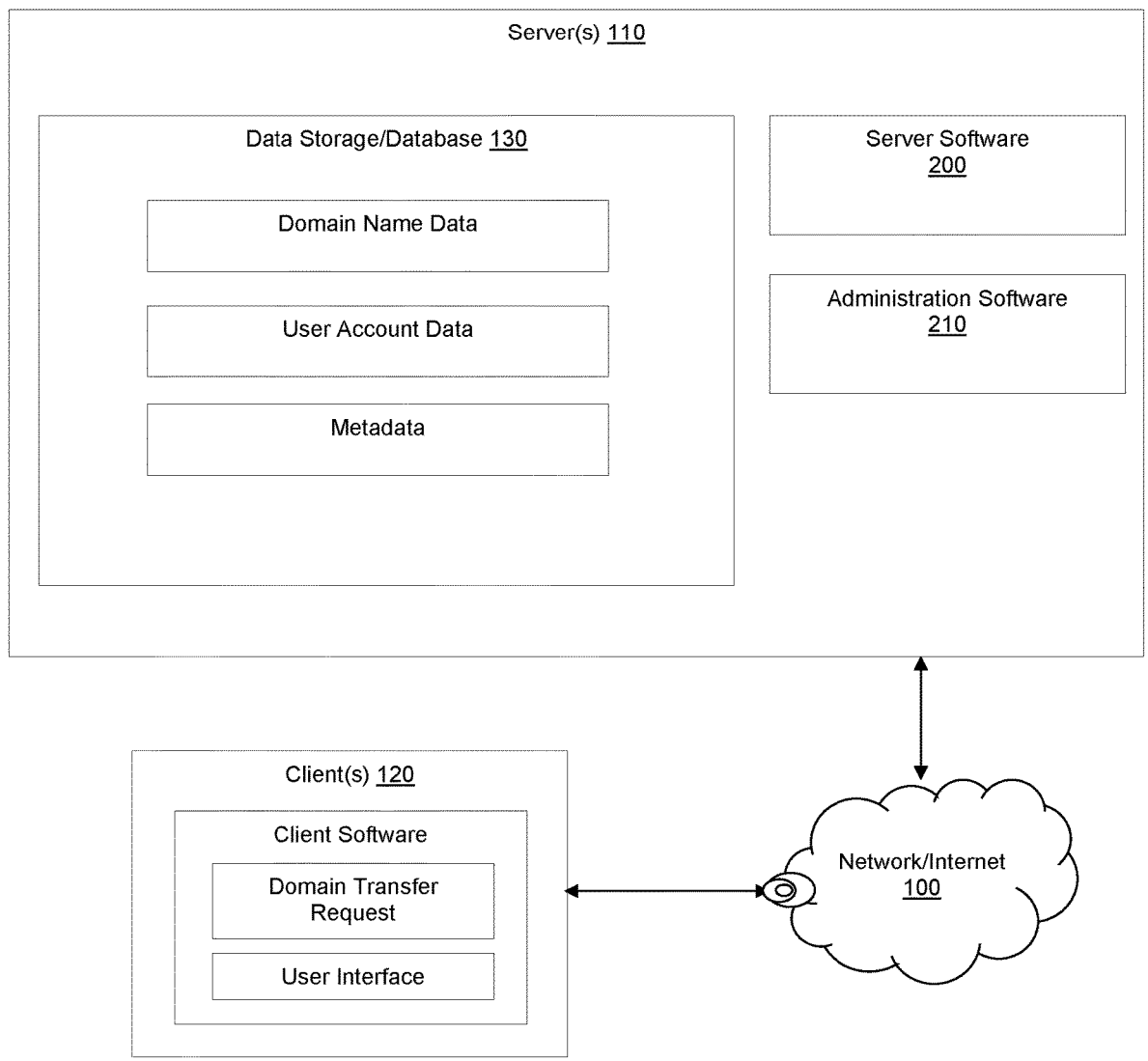
FIG. 2 illustrates a more detailed possible system for domain name transfer risk mitigation.

FIG. 2 shows a more detailed example embodiment of an environment for the systems, and for accomplishing the method steps, disclosed herein. As non-limiting examples, all disclosed software modules 200 may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200. Thus, the disclosed system may be configured to execute any or all of the method steps disclosed herein.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program 210 such as GoDaddy's My Account control panel for management of hosting and domain names, as a non-limiting example.

In such an administration control panel program, or admin 210, each user may be assigned a user id. This user id may identify transactions performed by each user, or other data, such as authentication information disclosed herein. These transactions, user account data 220, authentication data and/or other data may be stored as data records in data storage 130, each data record including the user id to associate the user with the relevant user or other data in data storage 130.

The admin 210 may include a Domain Control Center (DCC) for administration of domain names registered to the user. As non-limiting examples, the DCC may include means for listing and managing all domain names registered to the registrant, possibly including auto renewal of the domains, DNS record settings, etc. In some embodiments, the DCC may be used to display the disclosed notices, reports and/or domain name purchase offers, as described in more detail herein.

To increase security of domain name transfer process, the disclosed invention may comprise: 1) the TREA; and 2. the Transfer Workflow System disclosed above, which incorporates the TREA as a filtering mechanism to identify transfer requests that are of high risk so that they can be handed by a more rigorous manual review process.

The disclosed inventions attenuate risks in the domain name transfer process by injecting an algorithmic filtering system and increased scrutiny on potentially bad transfers. A domain name registrar may inject additional pathways and logic into the standard domain transfer processes that will leverage a dynamic algorithm to assess the likelihood that a domain transfer or set of domain transfers is not valid.

The algorithmic filtering system may assess the characteristics of a domain transfer to identify those that are at high risk of being part of a domain theft and may further provide increased scrutiny on the transfer request in an effort to protect customers' domains. The algorithmic filtering system may include an automated process to detect risky transfer requests and route them through a queue for analysis and approval. Non limiting examples of such a queue may include a manned queue, or a more rigorous automated queue.

In the disclosed embodiments, a registry may send a transfer request to a domain name registrar for the transfer or other modifications to a domain name. Although a transfer request is used as a non-limiting example in this disclosure, the request may be for any administrative or management functions related to the domain name.

In a non-limiting example embodiment, a domain transfer request may be sent to a registrar from the registry. As non-limiting examples, this transfer request may be sent via an email, a phone call, a fax, an EPP poll event, etc.

Server(s) 110 for the registrar or any other domain name administration or management-related entity may be configured to receive and analyze the domain name transfer request in order to apply the TREA, disclosed below.

Server(s) may analyze, and apply to the TREA, data associated with the domain name from several sources. Specific behaviors within the analyzed and applied data may comprise signals. For purposes of this disclosure, signals may be defined as the identification and application, within the TREA, of this domain name data, which determines whether a transaction for a modification to the administration or management of a domain name, such as a domain name transfer request, will be more likely or less likely to be a valid request or a suspect request.

As non-limiting examples, this identified, applied and analyzed data may include any of multiple general categories comprising data associated with: general characteristics of a currently registered domain name; a user and/or shopper account associated with the registered domain name and/or a domain name transfer request (and/or behavior related to this account); metadata received in association with the registered domain name, the user account and/or the domain name transfer request; one or more domain name registries; one or more destination registrars; details of the transaction itself.

A domain name may have different characteristics that define it in its state at the time that it's being dealt with. As non-limiting examples, these characteristics may comprise: a registry that the domain name is associated with; a TLD that the domain name is associated with; a registrar of record; name servers associated with it; etc. These characteristics, when analyzed within the context of other, non-domain signals, can be indicative of patterns that indicate an elevated risk of fraudulent domain activity. It is through this contextual analysis that risk indicators may be detected.

Potential high-risk domain characteristics may include recent cancellation of any attached products specifically designed to aid in the prevention of domain loss through unintended expiration (e.g., cancellation within a pre-set number of days), domain disputes, etc. As a non-limiting example, GODADDY's PROTECTED REGISTRATION product prevents any changes made to a domain name, including transfers to another registrar. This feature may only be cancelled by going through a proprietary process and providing certain identification documents. If, for some reason, there was forgery of these documents, using the period of time following the cancellation of the product as a signal of a high-risk transfer, could prevent an unauthorized transfer away from the current registrar.

The domain name characteristics may comprise a second tier of information. These characteristics about each domain name may comprise DNS characteristics. As non-limiting examples, these second tier characteristics may comprise IP addresses that the domain name is pointing to and mail servers that the domain name is using.

In the context of determining whether a specific domain name transfer request transaction is likely to be valid or suspect, this second tier of information may include, as non-limiting examples: the IP address of the person requesting the transfer or the IP address of the person that requested the authorization code from the domain manager; or how recently the email address on the user/shopper account was changed.

The domain name may exist within a context. Therefore, in addition to characteristics that define the domain name, a plethora of contextual information may exist around the domain name, including contextual information regarding the domain name, regarding the account, regarding the registry; regarding the registrars; etc. The domain name characteristics and/or domain name contextual information, when analyzed, may form a picture reflecting whether or not a specific domain name transfer request is likely to be solidly valid or possibly suspect.

Various determinations may be made from each domain name's contextual information. As non-limiting examples, different elements of a domain name's context may be used to determine: how popular a domain name is; how new or old the domain name is; how valuable the domain name is; the length of the domain; whether or not the domain name is being managed by a reputable registrar; whether the registry managing the domain name, or the TLD for the domain name itself is it highly susceptible to spam because of the cost of the domain name, etc.

In the context of determining whether a specific domain name transfer request transaction is likely to be valid or suspect, additional context information and/or domain name characteristics may be utilized, including, as non-limiting examples: the IP address of the person requesting the transfer; the IP address of the person that requested the authorization code from the domain manager; how recently the email address on the user/shopper account changed, etc.

As noted above, data from a registrar's user or shopper account may be a non-limiting example of data used to determine whether a request is more likely or less likely to be a valid request or a suspect request. The registrar may maintain a database associated with each shopper's account. The registrar may further maintain a full and complete history of every action taken against every domain name.

As non-limiting examples, data used in association with the user or shopper account may comprise: the age of the account, the number of domains in the account; previous transfer activity associated with the account; password resets associated with the account; shopper email changes within the account; changes of account within a set period, such as number of days; a determination of whether two-step or two-factor authentication is enabled; a threshold number of previously failed login attempts within a set period, such as number of days; previous renewals or any other type of orders; a login and/or IP address significantly different than previous logins, based on region, etc.

As a non-limiting example, if an email account is hacked, the email address might not necessarily change on the account associated with a customer, as the malicious user may want to hide his tracks. However, a recent password reset on the customer account using details from the hacked email account, in addition to other factors/characteristics, may illustrate a risky request.

As noted above, behavior related to a registrant's user account may be a non-limiting example of data used to determine whether a request is more likely or less likely to be a valid request or a suspect request. The registrar, DNS or hosting provider and/or registry may keep logs of access to accounts over a period of time, which may or may not be typical behavior for the registrar and/or registry.

As a non-limiting example of such user behavior, the request may be for a domain name transfer. If the account comprises hundreds of domain names, and this is the first transfer out of the registrant's account in a significant (e.g., two-year) period, this may comprise a low level signal that would feed into the algorithm to determine that this particular domain name request comprises a suspect request.

As another non-limiting example, if the administrative account for the domain name(s) had recently undergone a password change, this may comprise a low level signal that would feed into the algorithm to determine that this particular domain name request comprises a suspect request.

As another non-limiting example, the authorization code (e.g., EPP) for the domain name transfer or other modification may be emailed to the address. If the email address associated with the registrant or administrator for the domain name has changed within a set period of time (e.g., 7 days/15 days), the email address may have been hacked, so the authorization code may be transmitted to someone that is trying to steal the domain name. As another non-limiting example, transfers to certain higher suspect registrars may signal a suspect request.

As noted above, behavior related to metadata received in association with the registered domain name, the user account and/or the domain name transfer request may be a non-limiting example of data used to determine whether a request is more likely or less likely to be a valid request or a suspect request. Server software 200 may analyze characteristics associated with metadata about a given domain name that can be used to analyze the likelihood that actions on the domain name will be unscrupulous.

As non-limiting examples, such metadata may include the length of the domain name; an estimated value of the domain name; an age of the domain name; recent contact changes related to the domain name; an Alexa Rank for the domain name (e.g., <500,000); domain name activity indicators, including DNS lookups, hosting activity and/or an email profile; a Google/Yahoo Rank; and/or any abuse complaint activity, such as a recent account change.

Server software 200 may be configured to evaluate the metadata regarding the transfer request as well as the source registrar customer account in order to identify activity that could indicate malicious behavior. The metadata and customer account data may be used to analyze the likelihood that actions on the domain are going to be undertaken by unscrupulous individuals or whether the request will comprise a typical problem-free domain name transfer.

Other examples of metadata may be related to the IP address associated with the domain name being modified. This non-limiting example may comprise determining the history of IP access for the account or determining from where the authorization code was requested. As a non-limiting example, the IP address associated with the domain name account access and/or transfer may be an abnormal IP address in a regional sense.

For example, the registrar and/or registry may determine that in the last month a shopper being tracked has logged in to their domain name administration account seven times and that during these seven logins, the user has always logged in from somewhere in North America, specifically in California in this example.

The registrar and/or registry may then receive a domain name transfer request from the gaining registrar, with an authorization code request coming out of Taiwan, with an IP address that's registered with an ISP in Taiwan. The registrar may identify the transfer request with an authorization code coming out of Taiwan as a signal that the domain name request comprises a suspect request.

Although possible that the registrant simply sold the domain name to someone in Taiwan, the sale may constitute a low level signal that the request may be suspect. In this example, the IP address is different from all (or at least a vast majority of) other domain name logins and/or transfers that have been used to access the domain or accounts at the registrar.

Thus, data about a registry, a destination registrar and/or the transaction for a domain name transfer itself may also be non-limiting examples of data used to determine whether a request is more likely or less likely to be a valid request or a suspect request. Data about the registry may include, as non-limiting examples, whether it supports a request for enforcement-like process and/or the cost of the domain name or individual TLD.

Data about the destination registrar may comprise a current number of domain name-related disputes involving the destination registrar; a measure of workability; a specific bad-actor; and/or the age of registrar. Data about the transaction itself may comprise the destination registrar; a historical IP vs. a request for an authentication code IP; and/or an abnormal account access time. For example, if the time authorization code was requested vs. a usual time account is accessed (e.g., the auth code request is made at 1 am customer's time, when they have always accessed their account during 8 am-5 pm hours).

Any of the data related to the transaction as described above may be used to determine whether a request is more likely or less likely to be a valid request or a suspect request, and may be analyzed over time, using machine learning to identify the likelihood that a certain request for a transfer may be something that requires extra human eyes on it. The training data for such machine data may comprise the signal data discussed herein, along with the empirical data regarding the transfers that are subsequently deemed to be valid or invalid.

Thus, over the maturity of the domain name, various contextual elements and domain name components may be used to determine whether particular domain name requests are valid or suspect requests.

Server(s) 110 may be configured to identify the signals within the received data and determine whether the signals move from a low risk to the realm of a substantial risk to that of excessive risk. Server software 200 may therefore comprise algorithms that would help to identify the likelihood that a certain request for a transfer request may be something that requires extra human eyes on it.

The determination of risk level may be done cumulatively across all of the signals that are available for a specific transfer request. While an individual signal may indicate that the risk is excessive, it would need to be considered within the context of recent transfer activity and recent domain theft activity. For example, if a known bad-actor submits transfer requests from Taiwan to a specific gaining Registrar A, the existence of Taiwan or Registrar A in the request may not indicate substantial risk. A transfer request that is both initiated from Taiwan and with gaining Registrar A, however, may indicate substantial risk. Excessive risk may occur in the latter case if the gaining Registrar A has a history of being uncooperative in restoring domains to their rightful owners.

Some identifiers may set the domain immediately to manual review, such as historical IP records, and the destination registrar. For substantial risk, there may be one or more identifiers from each category such as a shopper/account, a domain metadata, a registry, a destination registrar, and/or the transaction itself.

If server(s) 110 determine that the signals within the received data are not above the threshold constituting an excessive risk, then the domain name transfer may advance or be completed according to any known domain name transfer or modification techniques known in the art. Transfer requests deemed to have low risk are therefore handled via standard transfer processing methods. However, transfer requests deemed to have high risk may be shunted into a queue for manual review. In other words, server(s) 110 may be configured to identify the likelihood that a certain request for a transfer may be something that requires extra human interaction. This determination may made by evaluating the cumulative risk represented by the amalgamation of individual signals that are available at the time of the transfer request and comparing those criteria against similar signal data compiled over time that are associated with known outcomes of transfer activity. If the threshold requiring extra human interaction is crossed, software running on server(s) 110 may be configured to generate a notice to system administrators recommending manual review of the suspect request(s).

If, after a manual review, the transfer risk is deemed to be low, the transfer request may be handled by standard transfer processing methods. Thus, in some embodiments, the administrator, after manual review, may update the status of the transfer request. An interface may be used by the administrator to approve. This interface may then send a signal to the server to process the transfer per current system design.

If the domain name is identified/entered as low risk, the domain name transfer or other modification to the domain name may proceed as usual, possibly using automated techniques known in the art to transfer or modify the domain name. However, if the domain name is identified/entered as a high risk, the server(s) 110 for the domain name administrator may be configured to generate a notification of the high risk domain name transfer or modification request.

If, after manual review, the transfer is deemed to be of high risk, the registrant may be contacted to obtain an affirmative response that the transfer request is valid. Thus, the domain name administrator/registrar may contact the registrant/customer, possibly via phone, email, SMS, etc. and responsive to a notification of a high risk domain name transfer to determine, via domain name registrant, the validity of the domain name transfer. The data for the phone number, SMS number, email or other contact data may be stored in data storage 130 in association with data for the user account.

The domain name administrator and/or registrar may make multiple attempts to contact the domain name registrant via the stored contact information. There may a 5-day period where a transfer can be held, as mandated by ICANN. There may be one attempt per day for 4 days to manually verify the transfer request with the customer. If unsuccessful at the end of the fourth day, the transfer may be automatically denied. If, after multiple attempts, the domain name registrant cannot be contacted, the domain name transfer or modification may be cancelled.

In some instances, the registrant/customer may be successfully contacted. In these instances, the system administrator may simply question the domain name administrator/registrar whether the domain name transfer/update was valid. If the registrant/customer indicates that the transfer request is not valid, the transfer request may be cancelled. If the pending-transfer request is not manually denied, it will be automatically denied by the system on the fourth day. However, if the registrant indicates that the transfer request is valid, the transfer request may be approved and fulfilled as requested.

Figure 3:
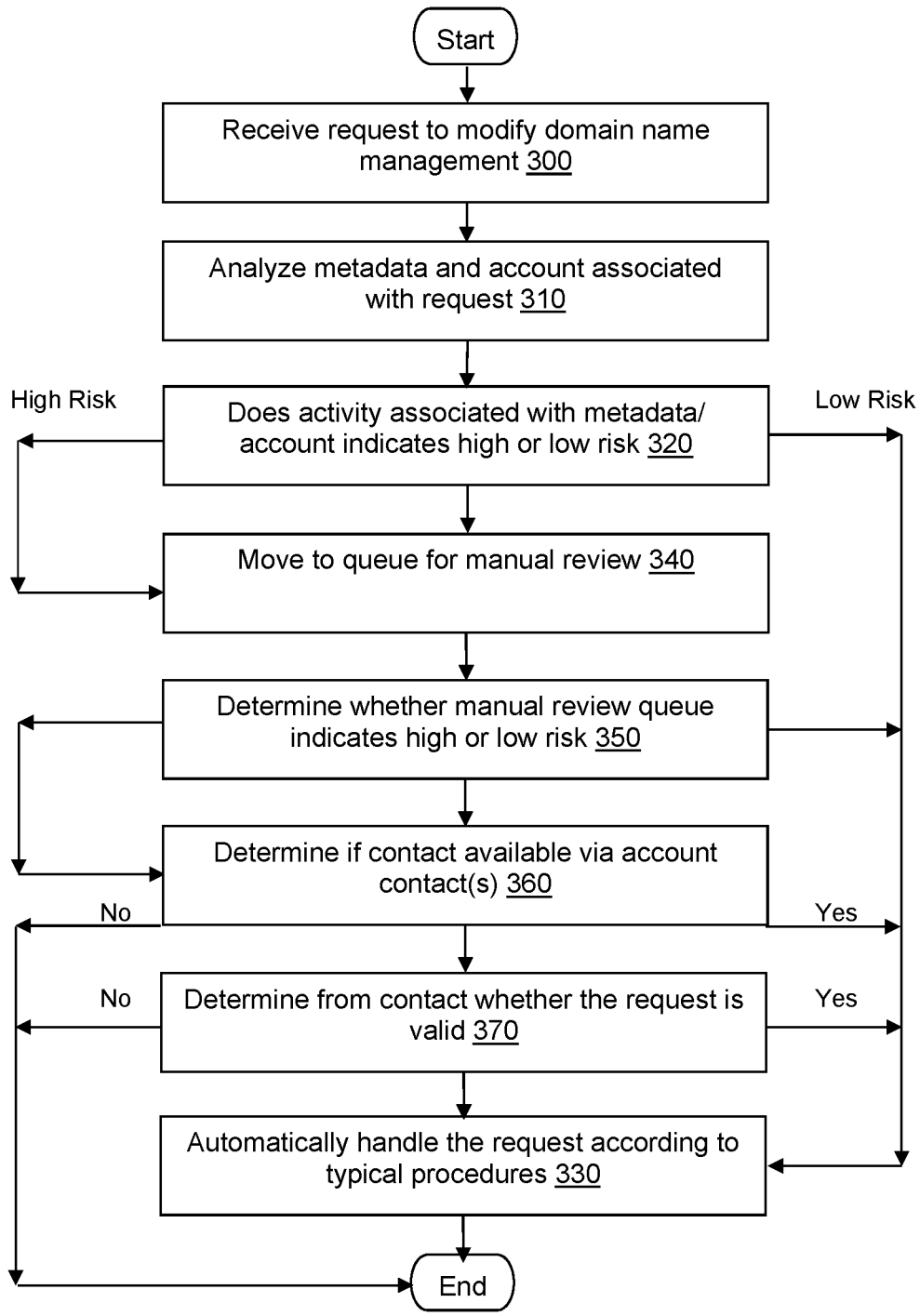
FIG. 3 is a flow diagram illustrating a possible embodiment of a method for domain name transfer risk mitigation.

Several different methods may be used to provide and manage the present systems. FIG. 3 represents a flow diagram for one possible embodiment of the previously described improvements on presently existing systems. In this example embodiment, one or more server computers 110 may be communicatively coupled to a network 100, and may be configured to: receive a request for a modification to management of a domain name (Step 300); analyze, in association with the request: at least one metadata; and an account for a registrant of the domain name, stored in data storage (Step 310); dynamically determine, from at least one metadata or the account, whether an activity associated with the domain name indicates a high risk or a low risk of a malicious behavior (Step 320); responsive to a determination that the activity indicates a low risk, automatically handling, by the server computer, the request (Step 330).

The server(s) 110 may be further configured to: responsive to a determination that the activity indicates a high risk, move the request to a queue for a manual review (Step 340); receive a user input result from the manual review determining whether the request is deemed a high risk (Step 350); responsive to a determination that the request is deemed a high risk, automatically determine whether the registrant is available via a contact associated with the account (Step 360); responsive to a determination that the customer is not available via the contact, automatically cancel the request; responsive to a determination that the customer is available via the contact, determine whether the request is a valid request (Step 370); responsive to a determination that the request is not a valid request, automatically cancel the request; and responsive to a determination that the request is a valid request, approve the request (Step 330).

The steps included in the embodiments illustrated and described in relation to FIGS. 1-3 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising: a database storing: a domain name; a user account associated in the database with the domain name and a registrant of the domain name, the user account comprising a contact associated with the user account; a historical data associated in the database with the domain name or the user account; a user device comprising a graphical user interface (GUI), the GUI including at least one GUI component receiving, as a user input to the GUI component, a request to transfer a registration of the domain name; a server comprising a hardware computing device coupled to a network and including at least one processor executing instructions within memory which, when executed, cause the system to: identify: a historical status based on at least one characteristic of the domain name or the user account within the historical data at the time of the registration of the domain name; a current status based on a modification of a pattern of use associated with an administration or management of the domain name or the user account, and calculate, for the request, a risk factor, indicating a level of malicious behavior related to the domain name, based on the modification; transfer the request to a queue for at least one manual review, responsive to: the risk factor indicating a high level risk of malicious behavior, receiving a user input result from the at least one manual review indicating that the request is a high level risk request, an unavailability of the registrant using the contact, or a response via the contact that the request is not a valid request; and transfer the registration according to the request, responsive to: the risk factor indicating that the request is a low level risk request, receiving the user input result from the at least one manual review indicating that the request is the low level risk request, or the response via the contact that the request is a valid request.

2. A system of claim 1, the instructions further causing the system to transfer the registration by transmitting at least one authorization code or Extensible Provisioning Protocol key to an email address stored in the user account.

3. The system of claim 1, the instructions further causing the system to calculate a cumulative risk factor by compiling an amalgamation of domain name and user account characteristics from the user account and the historical data; and compare the cumulative risk factor with a predetermined threshold to determine whether the request is the high level risk request or the low level risk request.

4. The system of claim 1, the modification comprising: an update to a password or an email address stored in the user account; a history of failed attempts to log in to the user account; an Internet Protocol address identifying a change to the geographical location of the registrant, a registry, or a registrar associated with the domain name; an anomalous time of use by the registrant; a new registry or registrar associated with the domain name; a destination registrar associated with the request; an age, a Top Level Domain, a registrar of record, a previous transfer history, or a recent cancellation associated with domain name; a Domain Name System characteristic associated with the domain name.

5. A system, comprising a server, comprising a hardware computing device coupled to a network and including at least one processor executing instructions within memory which, when executed, cause the system to: identify: a historical status based on at least one characteristic of a domain name or a user account within a historical data or the user account stored in a database at the time of a registration of the domain name; a current status based on a modification of a pattern of use associated with an administration or management of the domain name or the user account, and calculate a risk factor for a request to transfer a registration of the domain name received from a Graphical User Interface (GUI) component within a GUI displayed on a user device, the risk factor indicating a level of malicious behavior related to the domain name, based on the modification; transfer the request to a queue for at least one manual review, responsive to: the risk factor indicating a high level risk of malicious behavior, receiving a user input result from the at least one manual review indicating that the request is a high level risk request, an unavailability of the registrant using a contact stored in the database in association with the user account, or a response via the contact that the request is not a valid request; and transfer the registration according to the request, responsive to: the risk factor indicating that the request is a low level risk request, receiving the user input result from the at least one manual review indicating that the request is the low level risk request, or the response via the contact that the request is a valid request.

6. The system of claim 5, the server being further configured to identify the malicious behavior in association with an unauthorized transfer of a domain name.

7. The system of claim 5, the server being further configured to transfer the registration by transmitting at least one authorization code or Extensible Provisioning Protocol key to an email address stored in the user account.

8. The system of claim 5, the server being further configured to: calculate a cumulative risk factor by compiling an amalgamation of domain name and user account characteristics from the user account and the historical data; and compare the cumulative risk factor with a predetermined threshold to determine whether the request is the high level risk request or the low level risk request.

9. The system of claim 5, the modification comprising: an update to a password or an email address stored in the user account; a history of failed attempts to log in to the user account; an Internet Protocol address identifying a change to the geographical location of the registrant, a registry, or a registrar associated with the domain name; an anomalous time of use by the registrant; a new registry or registrar associated with the domain name; a destination registrar associated with the request; an age, a Top Level Domain, a registrar of record, a previous transfer history, or a recent cancellation associated with domain name; a Domain Name System characteristic associated with the domain name.

10. The system of claim 5, the server being further configured to store a user account data for the user account, and the historical data associated with the domain name or the user account as metadata within the database.

11. The system of claim 5, the server being further configured to store the contact in the database as: a telephone number; an SMS messaging number; or an email address.

12. The system of claim 11, the server being further configured to receive the response as: an in person interview using the telephone number; an SMS messaging response; or an email response.

13. A method, comprising identifying, by a server comprising a hardware computing device coupled to a network and including at least one processor executing instructions within memory: a historical status based on at least one characteristic of a domain name or a user account within a historical data or the user account stored in a database at the time of a registration of the domain name; a current status based on a modification of a pattern of use associated with an administration or management of the domain name or the user account, and calculating, by the server, a risk factor for a request to transfer a registration of the domain name received from a Graphical User Interface (GUI) component within a GUI displayed on a user device, the risk factor indicating a level of malicious behavior related to the domain name, based on the modification; transferring, by the server, the request to a queue for at least one manual review, responsive to: the risk factor indicating a high level risk of malicious behavior, receiving a user input result from the at least one manual review indicating that the request is a high level risk request, an unavailability of the registrant using a contact stored in the database in association with the user account, or a response via the contact that the request is not a valid request; and transferring, by the server, the registration according to the request, responsive to: the risk factor indicating that the request is a low level risk request, receiving the user input result from the at least one manual review indicating that the request is the low level risk request, or the response via the contact that the request is a valid request.

14. The method of claim 13, further comprising the step of identifying, by the server, the malicious behavior in association with an unauthorized transfer of a domain name.

15. The method of claim 13, further comprising the step of transferring the registration by transmitting at least one authorization code or Extensible Provisioning Protocol key to an email address stored in the user account.

16. The method of claim 13, further comprising the steps of: calculating, by the server, a cumulative risk factor by compiling an amalgamation of domain name and user account characteristics from the user account and the historical data; and comparing, by the server, the cumulative risk factor with a predetermined threshold to determine whether the request is the high level risk request or the low level risk request.

17. The method of claim 13, the modification comprising: an update to a password or an email address stored in the user account; a history of failed attempts to log in to the user account; an Internet Protocol address identifying a change to the geographical location of the registrant, a registry, or a registrar associated with the domain name; an anomalous time of use by the registrant; a new registry or registrar associated with the domain name; a destination registrar associated with the request; an age, a Top Level Domain, a registrar of record, a previous transfer history, or a recent cancellation associated with domain name; a Domain Name System characteristic associated with the domain name.

18. The method of claim 13, further comprising the step of storing, by the server, a user account data for the user account, and the historical data associated with the domain name or the user account as metadata within the database.

19. The method of claim 13, further comprising the step of storing the contact in the database as: a telephone number; an SMS messaging number; or an email address.

20. The method of claim 19, further comprising the step of receiving the response as: an in person interview using the telephone number; an SMS messaging response; or an email response.

* * * * *